(12) United States Patent
Sato et al.

(10) Patent No.: US 6,322,209 B1
(45) Date of Patent: Nov. 27, 2001

(54) INK, INK JET RECORDING METHOD AND APPARATUS USING SAME INK

(75) Inventors: Shinichi Sato, Kawasaki; Yutaka Kurabayashi, Tokorozawa, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/745,870

(22) Filed: Nov. 8, 1996

Related U.S. Application Data

(63) Continuation of application No. 08/240,477, filed on May 10, 1994, now abandoned.

(30) Foreign Application Priority Data

May 12, 1993 (JP) ...................................... 5-110559

(51) Int. Cl.[7] .................................................. B41J 2/01
(52) U.S. Cl. .................................................. 347/105
(58) Field of Search .................. 347/100; 106/31.13, 106/31.27, 31.6

(56) References Cited

U.S. PATENT DOCUMENTS

| | | | |
|---|---|---|---|
| 4,740,796 | * 4/1988 | Endo et al. | 347/544 |
| 4,931,810 | 6/1990 | Iwata et al. | 346/1.1 |
| 4,957,553 | * 9/1990 | Koike et al. | 106/20 |
| 5,081,470 | 1/1992 | Kurabayashi et al. | 346/1.1 |
| 5,172,133 | * 12/1992 | Suga et al. | 347/100 |
| 5,179,389 | * 1/1993 | Arai et al. | 347/57 |
| 5,324,349 | * 6/1994 | Sano et al. | 106/20 D |
| 5,395,434 | * 3/1995 | Tochihara et al. | 106/31.13 |
| 5,616,409 | * 4/1997 | Matsuda et al. | 428/323 |
| 5,623,294 | * 4/1997 | Takizawa et al. | 347/100 |

FOREIGN PATENT DOCUMENTS

| | | |
|---|---|---|
| 0441987 | 8/1991 | (EP) . |
| 0498293 | 8/1992 | (EP) . |
| 1258979 | 10/1989 | (JP) . |
| WO 9214794 | 9/1992 | (WO) . |

* cited by examiner

Primary Examiner—John Barlow
Assistant Examiner—Michael S Brooke
(74) Attorney, Agent, or Firm—Fitzpatrick, Cella, Harper & Scinto

(57) ABSTRACT

In an ink-jet recording method employing ink that includes an aliphatic or an alicyclic monohydric alcohol having a vapor pressure of 4 mmHg or less at 20 to 25° C., in which ink droplets are discharged by applying thermal energy onto the ink, and the amount of ink discharged, corresponding to one pulse of energy, is 5 to 20 pl/dot. A recording unit, and ink-jet recording apparatus employing the ink are also included.

17 Claims, 5 Drawing Sheets

INK, INK JET RECORDING METHOD AND APPARATUS USING SAME INK

This application is a continuation of application Ser. No. 08/240,477 filed May 10, 1994, now abandoned.

BACKGROUND OF THE INVENTION

1. Field of the Invention

The present invention relates to recording technology using an ink jet recording method, a means for obtaining photographs or graphics, or a hard color copy of computer graphics, color CRT displays, and the like. The present invention is also concerned with ink jet recording technology capable of reproducing color images close to an original image, clearly and at a high density.

2. Description of the Related Art

In ink jet recording methods, ink droplets are formed by various ink discharge methods, and they are adhered to recording members such as paper, converted paper, plastic films, or cloth. This method is silent because the recording head does not contact the member to be recorded, and is advantageous, for example, because high-speed printing is possible, and color images can be easily formed.

Personal computers, from the desk-top type to the lap-top and notebook type, have been increasingly developed to have color display devices. At the present time, when application software utilizing the power of color representation is available, it may be said that making printers having color capability is the most promising field.

The following is required for color ink jet recording:

(1) It should be capable of reproducing a color image close to the original image, clearly and at a high density in the case of photographs, and color graphics, or a hard color copy whose recording density of the recorded image is high, such as computer graphics or color CRT displays, and the like.

(2) There should be no mixing of different colors (bleeding) caused by non-fixing of the ink droplets when different colors are brought close to each other.

(3) The direction in which the ink droplets are discharged for each pulse, and the discharge speed thereof should be constant in order to achieve condition (1).

(4) It is thought that a specific color is used in a very small portion of a recording matter for color recording. Therefore, no defective ink discharge should occur when printing after a lapse of some time from when printing is stopped (including speed variation in (3)) as compared to the conventional monochrome ink.

It has been disclosed in, for example, Japanese Patent Laid-Open No. 1-258979 that the discharge stability during high-frequency driving is improved by having glycerol, methanol, ethanol, isopropyl alcohol, or butanol in the ink.

One way of increasing the recording density of a color image is to decrease the amount of ink discharged in one pulse. However, in an ink jet recording method, in particular, in which ink is discharged by using thermal energy, if conventional ink is used as it is, the direction the ink is discharged and the speed thereof can vary because the air bubbles expand differently for each pulse. Thus, the point at which the ink contacts the recording member varies, and streaks occur in the image. Also, if the amount of ink discharged is decreased as described above, the ink described in Japanese Patent Laid-Open No. 1-258979 is not enough. The same can be said of U.S. Pat. No. 4,931,810.

SUMMARY OF THE INVENTION

The present invention overcomes the above-described problems of the prior art. It is an object of the present invention to provide ink and an ink jet recording method capable of reproducing a color image close to the original image, clearly and at a high density when photographs or color graphics are used, or a color hard copy whose recording density of the recorded image is high such as when computer graphics or a color CRT display is obtained.

It is another object of the present invention to provide an ink, and an ink jet recording method and apparatus in which there is no bleeding, not only on paper dedicated to ink jet recording but also on plain paper; to make uniform the direction in which ink droplets are discharged for each pulse and at the discharge speed; and to prevent a defective discharge even after printing is stopped for some time.

The above-described objects can be achieved by the present invention which provides ink for use in an ink jet recording method in which ink droplets are discharged by applying thermal energy to the ink and the amount of ink discharged, corresponding to one pulse, is 5 to 20 pl/dot. The ink contains an aliphatic or an alicyclic monohydric alcohol having a vapor pressure of 4 mmHg or less at 20 to 25° C.

The present invention also provides an ink jet recording method and apparatus employing the above-described ink.

The above and further objects and novel features of the invention will be more apparent from the following detailed description, read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
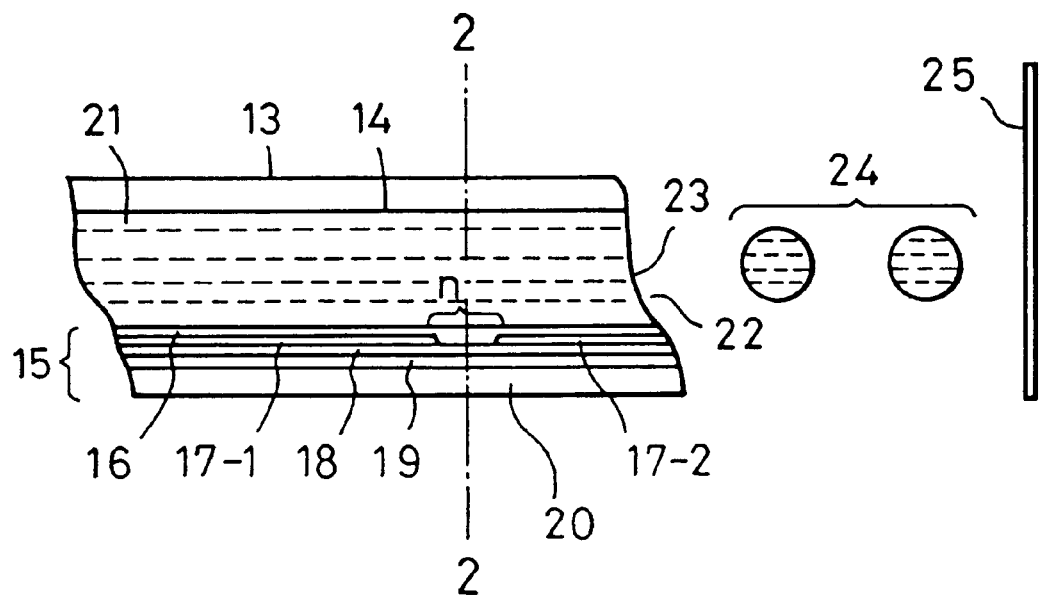
FIG. 1 is a longitudinal sectional view of the head section of an ink jet recording apparatus.

According to the present invention, the ink contains a specific aliphatic or an alicyclic monohydric alcohol and is used in an ink jet recording method in which thermal energy is applied to ink. The ink is discharged as a result of the expansion of the air bubbles generated thereby and the amount of ink discharged corresponding to one pulse is 5 to 20 pl/dot. Thus, the direction in which ink droplets are discharged for each pulse and the discharge speed are constant, making it possible to obtain an image having no distortion or streaks.

Although the details of the mechanism by which discharge is stabilized by this aliphatic or an alicyclic monohydric alcohol is unknown, it is thought to be as described below.

The decrease of the amount of ink discharged indicates that the generated air bubbles themselves become small. The ink used for ink jet recording has a large water content. It is known that the water, which is said to form the main constituent of the ink, has a strong molecular interaction, such as hydrogen bonding, and forms clusters. Also, it is a complex system in which numerous constituents, such as dyes, are mixedly present in the ink. Water is present in an aggregated manner in the hydrophobic portion of the dye. A complex step is repeated, for example, when this aggregated substance is destroyed by association with the dye. Therefore, the state of ink (in particular, the water content) in the step in which air bubbles are generated is not always constant. Since the step in which the air bubbles grow differs in particular in the high-frequency region, the volume of the air bubbles differs. As a result, the discharged speed and direction vary. It is presumed that the aliphatic or an alicyclic monohydric alcohol used in the present invention acts as a structure destroying agent, which releases the association of water molecules, making it possible to make the ink condition uniform and stabilize the discharge thereof even when recording at a high frequency of 6 kHz or more.

Substances appropriate for the present invention, having 4 mmHg or less at a vapor pressure of 20 to 25° C. include: pentanol isomers, such as 1-pentanol, 2-pentanol, 3-pentanol, tert-pentyl alcohol, or neopentyl alcohol, hexanol isomers, such as 1-hexanol or cyclohexanol, and heptanol isomers.

The total amount of this aliphatic or an alicyclic monohydric alcohol used in the ink is preferably 0.1 to 15 wt. %, and more preferably, 1 to 10 wt. % with respect to the total weight of the ink. Of course, this aliphatic or an alicyclic monohydric alcohol may be used by itself or two or more types of alcohol may be combined.

It is possible to use various types of water-soluble organic solvents to prevent clogging and improve discharge characteristics. Examples of such water-soluble organic solvents are: aliphatic or an alicyclic monohydric alcohols, such as methanol, ethanol, 1-propanol, 2-propanol, 1-butanol, 2-butanol, isobutyl alcohol, tert-butyl alcohol; polyalkylene glycol, such as polyethylene glycol or polypropylene glycol; alkylene glycols whose alkylene group contains 2 to 6 carbon atoms, such as ethylene glycol, propylene glycol, butylene glycol, triethylene glycol, 1,2,6-hexane triol, hexylene glycol, diethylene glycol, or thiodiglycol; glycerol; lower alkyl ethers of aliphatic or alicyclic monohydric alcohols, such as ethylene glycol methyl ether, diethylene glycol methyl (or ethyl), or triethylene glycol monomethyl (or ethyl) ether; amides, such as dimethylformamide or dimethylacetamide, ketone or ketone alcohols such as acetone or diacetone alcohol; ethers of tetrahydrofuran or dioxane; nitrogen-containing heterocyclic ketone of N-methyl-2-pyrrolidone, 2-pyrrolidone, 1,3-dimethyl-2-imidazolidinone, dimethylsulfoxide, and sulfolane. Of course, they are not limited to these examples. Of course, the water-soluble organic solvents are not limited to these examples.

It is possible to add these water-soluble organic solvents in amounts which do not reduce the advantages of the present invention. Desirable solvents include: polyethylene glycol, ethylene glycol, triethylene glycol, hexylene glycol, glycerol, thiodiglycol, and so on. It is preferable that the respective amounts of these solvents used is 1 to 30 wt. % with respect to the total weight of the ink.

Examples of dyes used in the present invention are: direct dyes, acid dyes, reactive dyes, disperse dyes, developed dyes, and so on. The respective amounts of the dyes used are determined based on the type of the liquid medium constituents, characteristics required for ink and the like. In general, these amounts should be from 0.5 to 15 wt. % with respect to the total weight of the ink, and more preferably from 1 to 7 wt. %.

It is possible to use nonionic surfactants, ionic surfactants, amphoteric surfactants, and the like in the ink in the present invention in order to adjust surface tension and improve fixing properties. The surfactants usable in the present invention are not particularly limited. However, preferable ones are: nonionic activators, such as an ethylene oxide addition product of alkali phenyl ether, polyethylene oxide-polypropylene oxide copolymers, or an ethylene oxide addition product of acetylene glycol; sulfate or sulfonate type anion activators; quarter-amine salt type cation activators; betaine or amino acid type amphoteric activators, and so on. The respective amounts of such surfactants used are preferably 0.01 to 20 wt. % with respect to the total weight of the ink.

The constituents of the ink of the present invention are those described above. In addition to these, it is possible to add to the ink, as required, a pH adjustor such as monoethanol amine, diethanolamine or triethanol amine; buffers; mildew preventive; urea and its derivatives; or thiourea and its derivatives, in a range which does not interfere with the objects of the present invention.

In the present invention, it is preferable that an alkali-soluble resin having a molecular weight of 3,000 to 20,000 be added into the ink in order to prevent oozing, i.e., color bleeding between different-color boundaries when printing is performed on plain paper.

The following are specific examples of alkali-soluble resins: styrene-acrylic copolymer, styrene-alkylester acrylate copolymer, styrene-α-methylstyrene-acrylate copolymer, styrene-α-methylstyrene-alkylester acrylate copolymer, styrene-methacrylate copolymer, styrene-methacrylate-alkylester acrylate copolymer, styrene-maleate-halfester, vinylnaphthalene-acrylate copolymer, vinylnaphthalene-maleate-copolymer, and so on. However, the structure of the alkali-soluble resin is not limited to these examples. The preferred content of these alkali-soluble resins within the ink is 0.3 to 5 wt. % with respect to the total weight of the ink.

Organic amine such as monoethanol amine, diethanolamine, or triethanolamine, or alkali such as sodium hydroxide, lithium hydroxide, or potassium hydroxide, can be used as a solubilizing agent for these resins. However, the solubilizing agent is not limited to these examples.

The details of the functions of the above alkali-soluble resin for color bleeding are not known. It is presumed that the hydrophobic group of the alkali-soluble resin is aligned on the surface of the ink, forming a resin film on the surface of the ink. For this reason, the surface viscosity increases, and blending between different-color inks is suppressed.

Another function of the alkali-soluble resin in the present invention is that the discharge stability becomes satisfactory just after discharge is started in a case in which after ink is discharged, the discharge is stopped and then the ink is discharged again because ink components are prevented from being evaporated in the nozzle tip as a result of the above-described surface film being formed.

Figure 2:
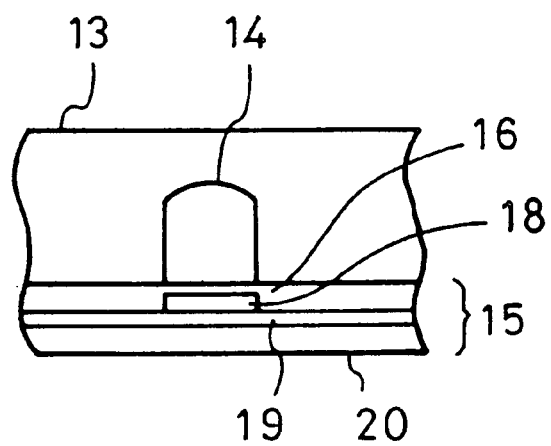
FIG. 2 is a lateral sectional view of the head section as shown by line 2—2 in the ink jet recording apparatus of FIG. 1.
Figure 3:
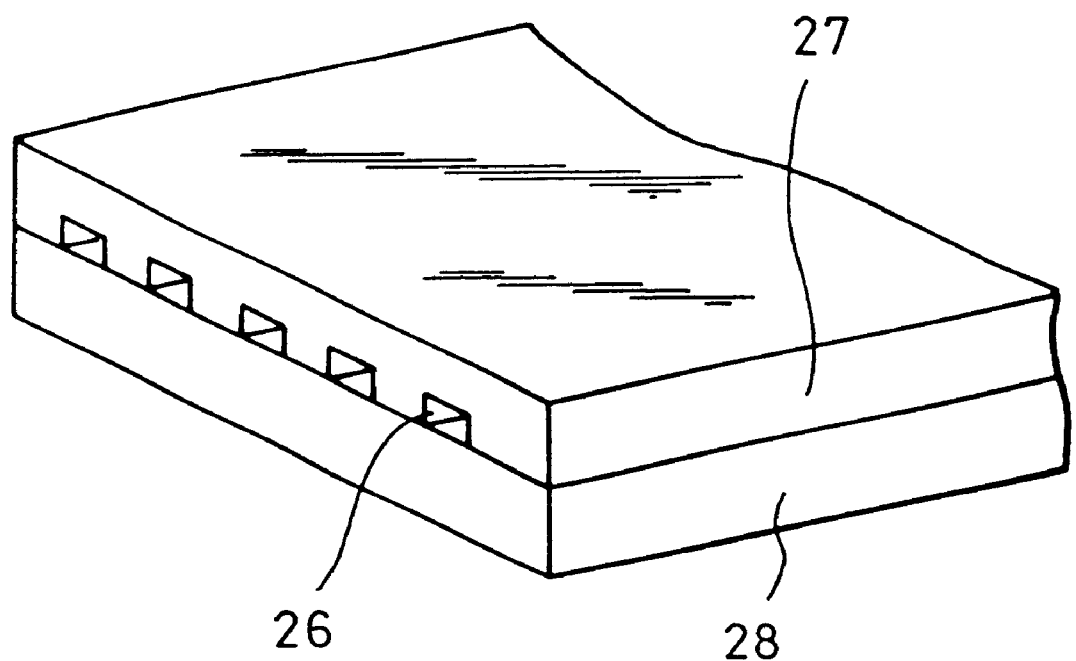
FIG. 3 is a perspective view of the exterior of the head section of the ink jet recording apparatus.

Next, a description will be given of a recording apparatus for generating droplets by applying thermal energy, which apparatus is suitable for the present invention. The construction of the recording head, which is the main portion of the apparatus, is shown in FIGS. 1 to 3.

A head 13 is obtained by bonding glass, ceramic or plastic which forms an ink passage to a heat generating head 15

(although the head is shown in the figure, it is not limited to this), having a heat generating resistive member, for use in thermal recording. The heat generating head 15 is composed of a protective film 16 formed of silicon oxide, aluminum electrodes 17-1 and 17-2, a heat-generating resistive layer 18 formed of nichrome or the like, a heat storage layer 19, and a substrate 20 having good heat dissipating properties, such as alumina.

Recording ink 21 reaches a discharge orifice 22, and forms a meniscus 23 by a pressure P. At this point, when an electrical signal is applied to the aluminum electrodes 17-1 and 17-2, the region indicated by n of the heat generating head 15 suddenly generates heat; air bubbles are generated in the ink 21 in contact with this region; the meniscus is discharged by that pressure; the droplets are formed into recording droplets 24 through the orifice 22, and jetted toward a recording member 25. FIG. 3 is a schematic diagram of the recording head in which a number of nozzles shown in FIG. 1 are arranged. The recording head is manufactured by bringing a glass sheet 27 having a number of passages into close contact with a heat generating head 28 having the same construction as that explained with reference to FIG. 1.

FIG. 1 is a sectional view of the head 13 along the ink passage. FIG. 2 is a sectional view taken along the line 2—2 of FIG. 1.

Figure 4:
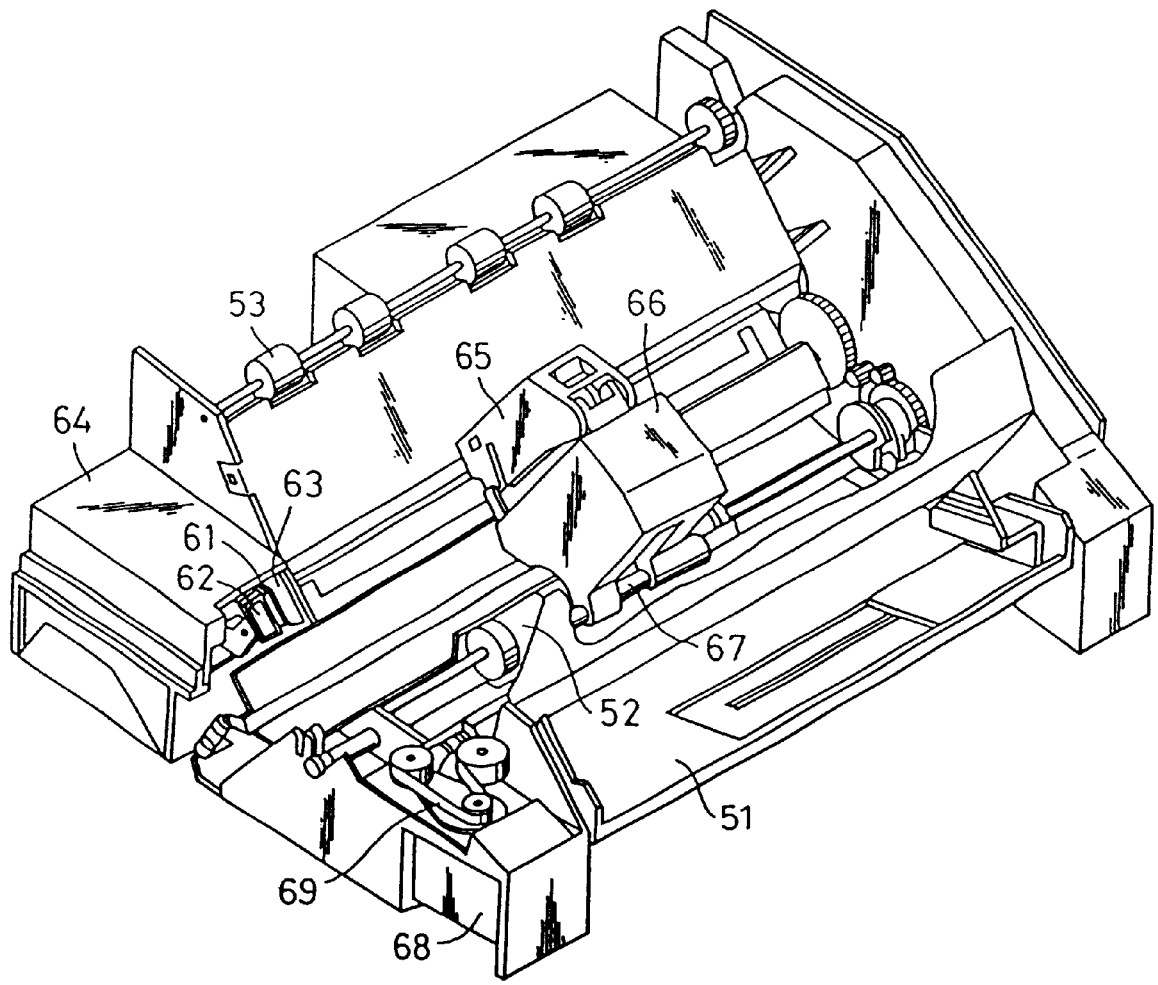
FIG. 4 is a perspective view illustrating an example of the ink jet recording apparatus.

FIG. 4 illustrates an example of an ink jet recording apparatus into which the head is incorporated.

In FIG. 4, reference numeral 61 denotes a blade serving as a wiping member, one end of which is held by a blade holding member and formed into a fixed end, forming a cantilever. The blade 61 is arranged at a position adjacent to the recording region by the recording head, is moved in a direction perpendicular to the direction the recording head is moved, and brought into contact with the surface of the discharge port so that capping is performed. Reference numeral 63 denotes an ink absorber disposed adjacent to the blade 61, and is held in such a manner as to protrude into the movement passage of the recording head in the same manner as the blade 61. The blade 61, a cap 62 and the ink absorber 63 constitute a discharge recovery section 64. Water, dust or the like is removed to the ink discharge port surface by means of the blade 61 and the absorber 63.

Reference numeral 65 denotes a recording head, having a discharge energy generating means, for performing recording by discharging ink onto a recording member facing the discharge port surface where the discharge port is arranged; and reference numeral 66 denotes a carriage having the recording head 65 installed therein, by which the recording head 65 is moved. The carriage 66 engages pivotally with a guide shaft 67, and a part of the carriage 66 is connected to a belt 69 (not shown) which is driven by a motor 68. As a result, it is possible for the carriage 66 to move along the guide shaft 67, and it is possible for the recording head 65 to move in the recording region and a region adjacent thereto.

Reference numeral 51 denotes a paper feed section into which recording members are inserted; and reference numeral 52 denotes a paper feed roller driven by a motor (not shown). With this construction, a recording member is fed to a position at which it faces the discharge port surface of the recording head, and as the recording progresses, the recording member is ejected onto the paper ejection section in which a paper ejection roller 53 is arranged.

In the above-described construction, when the recording head 65 returns to the home position because recording has been terminated or others, the blade 61 protrudes into the movement passage, though the cap 62 of the discharge recovery section 64 is retracted from the movement passage of the recording head 65. As a result, the discharge port surface of the recording head 65 is wiped. When capping is performed in a condition in which the cap 62 is in contact with the discharge port surface of the recording head 65, the cap 62 is moved so as to protrude into the movement passage of the recording head.

When the recording head 65 is moved from the home position to a position at which recording begins, the cap 62 and the blade 61 are at the same position as during wiping. As a result, the discharge port surface of the recording head 65 is wiped also in this movement.

The recording head is moved to the home position adjacent to the recording region not only when the recording is terminated or during a discharge recovery, but also while the recording head is moved in the recording region for the purpose of recording at predetermined time intervals. The above-described wiping is performed along with this movement.

Figure 5:
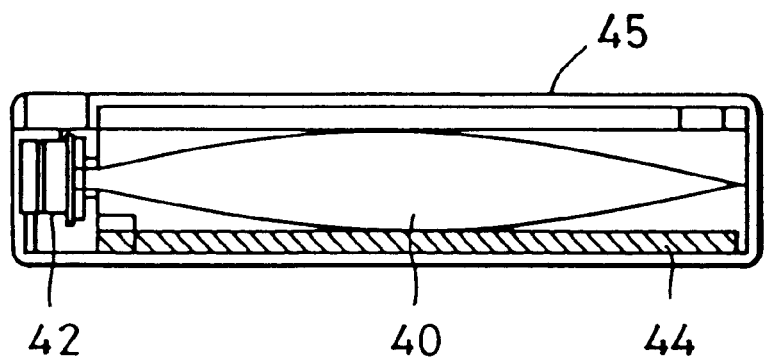
FIG. 5 is a longitudinal sectional view of an ink cartridge.

FIG. 5 illustrates an example of an ink cartridge having housed therein ink which is supplied via, for example, a tube. Reference numeral 40 denotes an ink housing section in which ink to be supplied is housed, for example, an ink bag, a rubber stopper 42 being provided in the extremity thereof. By inserting a needle (not shown) into this stopper 42, the ink in the ink bag 40 can be supplied to the head. Reference numeral 44 denotes an absorber for absorbing waste ink. The liquid contact surface with the ink of the housing section should preferably be formed of polyolefin, in particular, polyethylene. The ink jet recording apparatus used in the present invention is not limited to an apparatus in which the head is separate from the ink cartridge as described above, but an apparatus in which those members are made into one unit, as shown in FIG. 6, is preferably used.

Figure 6:
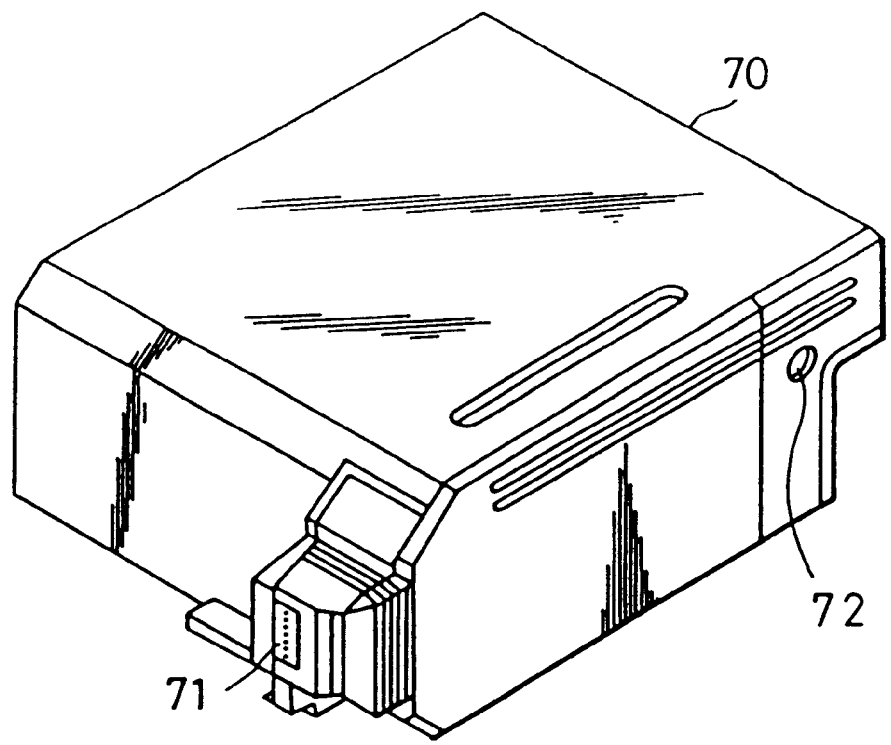
FIG. 6 is a perspective view of a recording unit.

In FIG. 6, reference numeral 70 denotes a recording unit in which an ink housing section having ink housed therein, for example, an ink absorber, is housed. The ink in such an ink absorber is discharged as ink droplets from a head section 71 having a plurality of orifices. Materials usable for the ink absorber include polyurethane. Reference numeral 72 denotes an air connection port for connecting the interior of the recording unit to the atmospheric air. This recording unit 70 is used in place of the recording head shown in FIG. 4, which recording unit 70 is mountable on and demountable from the carriage 66. Although an ink jet recording apparatus which discharges ink droplets by applying thermal energy onto ink is described as the recording apparatus used in the present invention, in addition to this, an ink jet recording apparatus of a piezoelectric type employing a piezoelectric element can also be used.

Figure 7:
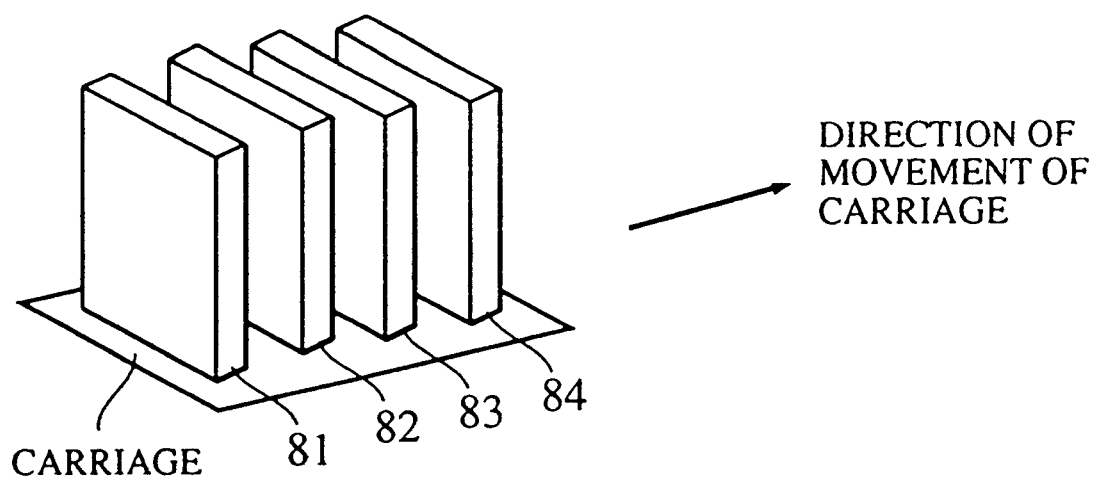
FIG. 7 is a perspective view illustrating the recording section in which a plurality of recording heads used in the embodiment of the present invention are arranged.

When the recording method of the present invention is performed, for example, a recording apparatus in which four recording heads shown in FIG. 3 are arranged on the carriage is used. FIG. 7 illustrates an example thereof. Reference numerals 81 to 84 denote recording heads for discharging recording ink of yellow, magenta, cyan and black, respectively. The head is disposed in the above-described recording apparatus, and discharges recording ink of each color in accordance with a recording signal.

The present invention will now be explained in more detail with reference to embodiments, comparative examples, and use examples. Parts and % in the description are calculated on the basis of weight unless otherwise stated.

Examples 1 to 3, Comparative examples 1 and 2

| Basic solvent composition | |
|---|---|
| A: Diethylene glycol | 10 parts |
| Polyethylene glycol | 5 parts |
| (Average molecular weight = 600) | |
| Thiodiglycol | 15 parts |
| Styrene-acrylic-ethylacrylate copolymer | 0.3 parts |
| (Weight-average molecular weight = 10,000, acid value = 190) | |
| Monoethanol amine | 0.1 parts |
| B: Glycerol | 5 parts |
| Thiodiglycol | 10 parts |
| Surfinol 465 | 1 part |
| (Manufactured by Nisshin Chemical Industry Co., Ltd.) | |
| Dyes: | |
| Black: C.I. Food Black 2 | 1.5 parts |
| C.I. Direct Black 168 | 2 parts |
| Yellow: C.I. Direct Yellow 68 | 2 parts |
| Magenta. C.I Acid Red | 2.5 parts |
| Cyan: C.I. Direct Blue | 2.5 parts |

TABLE 1

| | Examples | | | Comparative Examples | |
|---|---|---|---|---|---|
| Composition (Parts) | 1 | 2 | 3 | 1 | 2 |
| Basic solvent | A | B | A | A | B |
| 2-propanol | 3 | 2 | | 4 | 4 |
| Isobutyl alcohol | | | | | |
| Cyclohexanol | 1 | 1 | 2.5 | | |
| Water | Bal. | Bal. | Bal. | Bal. | Bal. |

The vapor pressure of aliphatic or an alicyclic monohydric alcohol (mmHg)

| 2-propanol | 32.4 | (20° C.) |
|---|---|---|
| Isobutyl alcohol | 8 | (20° C.) |
| Cyclohexanol | 1 | (21° C.) |

After the compositions of four colors in each of the embodiments shown in Table 1 were stirred sufficiently, they were filtered under pressure by a Fluoropore filter (product name: manufactured by Sumitomo Electric Industries, Ltd.) having a pore diameter of 0.22 $\mu$m, thus forming an ink of the present invention. An ink jet recording apparatus in which four ink jet heads (400 dpi) for generating droplets by applying thermal energy to the ink within the recording head and discharging the ink are arranged in the direction of the main scanning (FIG. 7), is provided, and recording was performed by jetting the above ink onto commercially available copy paper (Canon Inc. NP dry). In this embodiment, a head having a nozzle diameter of 20 $\mu$m, a nozzle pitch of 63.5 $\mu$m and a heater size of 24×28 $\mu$m and having 128 discharge ports was used, and it was driven so that the amount of discharge was 10 pl/dot. The method and conditions of the evaluation items were as follows. The results are shown in Table 2.

(1) Bleeding

A color sample, with different colors adjacent to each other, was printed in such a way that one dot was completed by three scannings by using three ink droplets (the amount of ink jetted per one dot was 30 pl). The bleeding state was then observed and evaluated on the basis of the criteria described below. Seven colors were used: black, yellow, cyan, magenta, and red, green and blue, which colors were made by jetting two colors from among yellow, cyan and magenta and mixing them.

A: No bleeding was observed in all the boundaries.
B: Bleeding was conspicuous in the boundary between red, green and blue where there was a great amount of ink adherence.
C: Bleeding was severe in almost all the boundaries.

(2) Discharge properties 1 (after printing was stopped)

After alphanumeric characters were printed continuously for 1 minute in a condition in which the printer was filled with ink of each color, the printing was stopped, and the ink was allowed to stand in a non-capped state for 10 seconds, after which printing was performed again. The discharge properties were evaluated on the basis of the presence or absence of irregularities or loss of dots of each color in the above case.

A: There were no irregularities starting from the first dot of each color
B: Although there was a small amount of irregularities in the first dot of each color, there was no non-ink-discharge and the level of irregularities was low. Therefore, there is no problem from a practical point of view.
C: Irregularities and non-ink-discharge were present in the first dot of each color, and the level of irregularities was high, which is problematical from a practical point of view.
D: Most first dots were irregular or lost. Even if ink was discharged for several dots, the irregularities and loss were not cancelled.

(3) Discharge properties 2 (initial discharge properties)

The speed at which ink (basic solvent+alcohol+water), the dye of which has been replaced with water in the ink of each embodiment, was discharged was measured by using an ink jet recording head evaluation apparatus (manufactured by Canon Inc.). An evaluation was performed by considering a standard deviation/discharge speed (%) to be a fluctuation of the speed.

A: 10% or less during 10 kHz driving
C: exceeds 10% even during not higher than 8 kHz driving

TABLE 2

| | Evaluation Items | | |
|---|---|---|---|
| | (1) | (2) | (3) |
| Example 1 | A | | A |
| Example 2 | A | B | A |
| Example 3 | A | B | A |
| Comparative Example 1 | B | D | A |
| Comparative Example 2 | B | D | A |

Examples 4 to 10

| Basic solvent composition: | |
|---|---|
| Thiodiglycol | 15 parts |
| Urea | 5 parts |
| Styrene-acrylic-acrylic ethyl copolymer | 4 parts |
| (weight-average molecular weight: 3,500, acid value: 190) | |
| Monoethanolamine | 0.27 parts |
| Dyes: | |
| Black: C.I. Food Black 2 | 2.0 parts |
| C.I. Direct Black 168 | 2.0 parts |

-continued

| Basic solvent composition: | |
|---|---|
| Yellow: C.I. Direct Yellow 86 | 2.0 parts |
| Magenta: C.I. Acid Red 52 | 2.5 parts |
| Cyan: C.I. Direct Blue 199 | 2.5 parts |

TABLE 3

| | Examples | | | | | | |
|---|---|---|---|---|---|---|---|
| Composition (parts) | 4 | 5 | 6 | 7 | 8 | 9 | 10 |
| Isopropyl alcohol | | 4.0 | 2.5 | | | | |
| Isobutyl alcohol | | | | | 2.0 | 1.0 | |
| Cyclohexanol | 2.5 | 1.5 | 1.0 | | | | |
| 1-pentanol | | | | 3.0 | 2.0 | 1.5 | |
| 2-methyl-1-butanol | | | | | | | 2.0 |
| 3-methyl-1-butanol | | | | | | | 2.0 |
| Water | Bal. | Bal. | Bal. | Bal. | Bal. | Bal. | Bal. |

The vapor pressure of alcohol described in Table 3 (mmHg)

| 1-pentanol | 2.4 (25° C.) |
|---|---|
| 2-methyl-1-butanol | 3.1 (25° C.) |
| 3-methyl-1-butanol | 2.4 (25° C.) |

Inks were prepared in the same manner as in Examples 1 to 3. An ink jet recording apparatus described in Examples 1 to 3 was used and it was driven so that the amount of discharge was 7 pl/dot. Evaluation was made in the same manner as in Examples 1 to 3. The results are shown in Table 4.

TABLE 4

| | Evaluation items | | |
|---|---|---|---|
| | (1) | (2) | (3) |
| Example 4 | A | A | A |
| Example 5 | A | A | A |
| Example 6 | A | A | A |
| Example 7 | A | A | A |
| Example 8 | A | A | A |
| Example 9 | A | A | A |
| Example 10 | A | A | A |

Examples 11 to 13

The same ink as in Example 6 was prepared except that alkali-soluble resin shown in Table 6 was used.

Evaluation was made in the same manner as in Example 6 except that an ink jet recording apparatus with a head having a nozzle diameter of 25 μm was used and it was driven so that the amount of discharge was 15 pl/dot. The results are shown in Table 7.

TABLE 6

| Examples | Alkali-soluble resin | Acid Value | M.W. | Amount (parts) | alkali | Amount (parts) |
|---|---|---|---|---|---|---|
| 11 | Styrene-acrylic acid-ethyl acrylate copolymer | 150 | 7,500 | 2.5 | NaOH | 0.20 |

TABLE 6-continued

| Examples | Alkali-soluble resin | Acid Value | M.W. | Amount (parts) | alkali | Amount (parts) |
|---|---|---|---|---|---|---|
| 12 | Same one as in Example 11 | 180 | 10,000 | 1.5 | NaOH | 0.15 |
| 13 | Styrene-acrylic acid | 220 | 15,000 | 0.5 | NaOH | 0.05 |

TABLE 7

| | Evaluation items | | |
|---|---|---|---|
| Examples | (1) | (2) | (3) |
| 11 | A | B | A |
| 12 | A | B | A |
| 13 | A | B | A |

According to the present invention, as described above, it is possible to obtain an ink for use in an ink jet and a recording method in which the ink does not bleed, not only paper dedicated for an ink jet, but also plain paper. With this novel ink, the discharge direction and the discharge speed of ink droplets for each pulse are constant in a small-droplet head, and there is no defective discharge even after a lapse of some time from when printing has been stopped.

Bleeding between different colors is remarkably decreased even when printing is performed on plain paper.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A method for stabilizing discharge of dye-based aqueous ink in ink jet recording, comprising the steps of:

selecting an ink comprising a dye, water, and an aliphatic or an alicyclic monohydric alcohol for releasing association of water molecules contained in the ink, the aliphatic or alicyclic monohydric alchohol being selected from the group consisting of 1-hexanol, cyclohexanol, and heptanols, and having a vapor pressure of 4 mmHg or less at 25° C.; and discharging the ink in an amount, corresponding to a single pulse of energy, from 5 to 20 pl/dot, said discharge being stabilized by the aliphatic or alicyclic monohydric alcohol releasing the association of water molecules contained in said ink.

2. A method for stabilizing discharge of ink in ink jet recording according to claim 1, wherein, in said selecting step, the ink contains the monohydric alcohol in an amount ranging from 0.1 to 15 wt. % with respect to a total weight of the ink.

3. A method for stabilizing discharge of ink in ink jet recording according to claim 1, wherein, in said selecting step, the ink further contains alkali-soluble resin having molecular weight of 3,000 to 20,000.

4. A method for stabilizing discharge of ink in ink jet recording according to claim 3, wherein the alkali-soluble resin is contained in an amount ranging from 0.3 to 5 wt. % with respect to a total weight of the ink.

5. A method for stabilizing discharge of ink in ink jet recording according to claim 1, wherein said alcohol is 1-hexanol.

6. A method according to claim 1, wherein said discharge has a driving frequency set at 6 kHz or more.

7. A recording unit, comprising:
   an ink housing section that holds an ink comprising a dye, and an aliphatic or an alicyclic monohydric alcohol selected from the group consisting of 1-hexanol, cyclohexanol and heptanols, and having a vapor pressure of 4 mmHg or less at 25° C.; and
   a head section for discharging an amount of said ink as ink droplets by applying thermal energy, wherein the amount of ink discharged is from 5 to 20 pl/dot.

8. A recording unit according to claim 7, wherein said alcohol is 1-hexanol.

9. An ink jet recording apparatus, comprising:
   an ink housing section that holds an ink comprising a dye, and an aliphatic or an alicyclic monohydric alcohol selected from the group consisting of 1-hexanol, cyclohexanol, and heptanols, and having a vapor pressure of 4 mmHg or less at 25° C.; and
   a recording unit having a head section for discharging an amount of said ink as ink droplets by applying thermal energy, wherein the amount of ink discharged is from 5 to 20 pl/dot.

10. An ink jet recording apparatus according to claim 9, wherein said alcohol is 1-hexanol.

11. An ink jet recording apparatus, comprising:
   an ink housing section that holds an ink comprising a dye, and an aliphatic or an alicyclic monohydric alcohol selected from the group consisting of 1-hexanol, cyclohexanol, and heptanols, and having a vapor pressure of 4 mmHg or less at 25° C.; and
   a recording head having a head section for discharging an amount of said ink as ink droplets by applying thermal energy, wherein the amount of ink discharged is from 5 to 20 pl/dot.

12. An ink jet recording apparatus according to claim 11, further comprising an ink supply section for supplying ink housed in an ink cartridge to said recording head.

13. An ink jet recording apparatus according to claim 11, wherein said alcohol is 1-hexanol.

14. A recording unit comprising:
   an ink housing section that holds an ink comprising a dye, and an alicyclic or an aliphatic monohydric alcohol having a vapor pressure of 4 mmHg or less at 25° C., said monohydric alcohol being provided in an amount ranging from 0.1 to 15 wt. % with respect to a total weight of the ink, and being selected from the group consisting of 1-hexanol, cyclohexanol and heptanols; and
   a head section for discharging said ink as ink droplets by applying thermal energy, wherein the amount of ink discharged is from 5 to 20 pl/dot.

15. An ink jet recording apparatus comprising:
   an ink housing section that holds an ink comprising a dye, and an alicyclic or an aliphatic monohydric alcohol having a vapor pressure of 4 mmHg or less at 25° C., said monohydric alcohol being provided in an amount ranging from 0.1 to 15 wt. % with respect to a total weight of the ink, and being selected from the group consisting of 1-hexanol, cyclohexanol and heptanols; and
   a recording unit having a head section for discharging said ink as ink droplets by applying thermal energy, wherein the amount of ink discharged is 5 to 20 pl/dot.

16. An ink-jet recording apparatus comprising:
   an ink housing section that holds an ink comprising a dye, and an alicyclic or an aliphatic monohydric alcohol having a vapor pressure of 4 mmHg or less at 25° C., said monohydric alcohol being provided in an amount ranging from 0.1 to 15 wt. % with respect to a total weight of the ink, and being selected from the group consisting of 1-hexanol, cyclohexanol and heptanols; and
   a recording head having a head section for discharging said ink as ink droplets by applying thermal energy.

17. An ink-jet recording apparatus according to claim 16, further comprising an ink supply section for supplying ink housed in an ink cartridge to said recording head.

* * * * *

UNITED STATES PATENT AND TRADEMARK OFFICE
CERTIFICATE OF CORRECTION

PATENT NO.      : 6,322,209 B1
DATED           : November 27, 2001
INVENTOR(S)     : Shinichi Sato et al.

It is certified that error appears in the above-identified patent and that said Letters Patent is hereby corrected as shown below:

Title page,
Item [56], References Cited, FOREIGN PATENT DOCUMENTS,
"1258979" should read -- 1-258979 --.
Insert:
-- OTHER DOCUMENTS
Patent Abstracts of Japan, Publ. No. JP 3255173, Appln, No. JP 900053958 (April 11, 1980).
Patent Abstracts of Japan, Publ. No. JP 55050073, Appln, No. JP 780122867, (November 14, 1991). --.

Column 8,
Line 20, "color" should read -- color. --; and
Table 2 (Line 47), "Example 1 A     A" should read -- Example 1 A B A --.

Signed and Sealed this

Twenty-eighth Day of January, 2003

JAMES E. ROGAN
*Director of the United States Patent and Trademark Office*